Aug. 22, 1950  R. J. URICK  2,519,418
RADIO CONTROLLED BEARING REPEATER
Filed April 12, 1946  2 Sheets-Sheet 1

INVENTOR.
ROBERT J. URICK
BY
Attorney

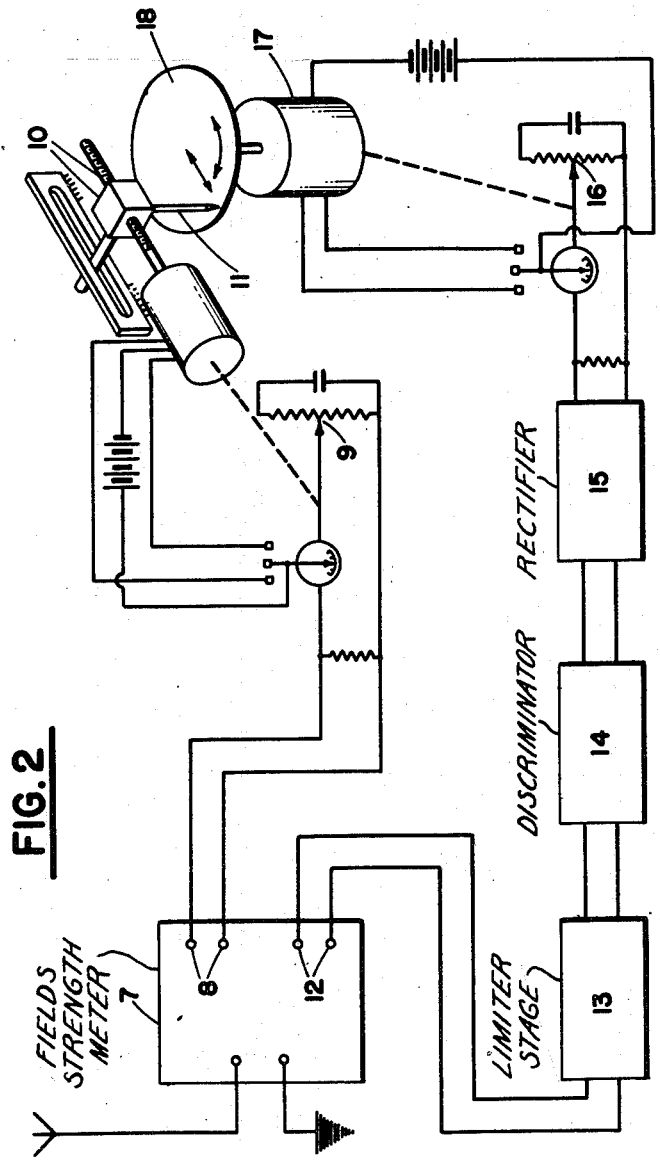

Patented Aug. 22, 1950

2,519,418

UNITED STATES PATENT OFFICE 2,519,418

RADIO CONTROLLED BEARING REPEATER

Robert J. Urick, San Diego, Calif.

Application April 12, 1946, Serial No. 661,635

4 Claims. (Cl. 343—100)

(Granted under the act of March 3, 1883, as amended April 30, 1928; 370 O. G. 757)

My invention relates to systems for determining the heading or course of ships, planes, and other vehicles equipped with signal emitting devices.

In accordance with my invention, a characteristic of a signal (for example, its modulation) originating in a ship, airplane, or other vehicle is varied in accordance with its displacement from a base heading so that at a receiving station the signal may be utilized to effect indication of instantaneous heading or a record of the course of the vehicle.

Further in accordance with my invention, the amplitude and modulation characteristics of the received signal are utilized to control elements of a recorder to trace the radiation pattern of the vehicle's antenna system as the vehicle turns in a relatively tight circle.

My invention further resides in systems having features hereinafter described and claimed.

For an understanding of my invention and for illustration of examples thereof, reference is made to the accompanying drawings, in which:

Figure 2 is a diagram of the shore station equipment.

Figure 1:
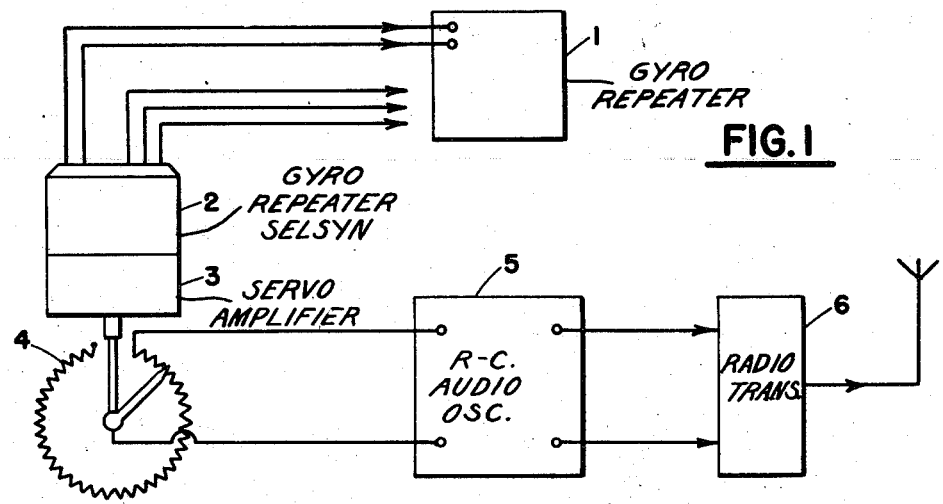
Figure 1 is a diagram of the shipboard equipment.

In Figure 1, a gyro repeater Selsyn 2 is used to transfer the ship's heading, as received from the gyro repeater 1, into a variable resistance. Of the five leads to the Selsyn, two are power leads and three stator leads. The output of the Selsyn first is amplified by a servo-amplifier 3 and then is able by means of a shaft to drive a low torque rheostat 4, the output resistance of which is a function of ship's heading. For every heading of the ship from 0°–360°, there is a corresponding position for the arm of the rheostat, which produces a varying resistance. Since this resistance determines the output frequency of a simple audio-frequency R. C. oscillator 5, there is a distinct audio-frequency corresponding to each position of ship's heading. The audio signal is fed to the microphone input terminals—or other stages, for example, the modulator—of the ship's radio transmitter 6, producing an audio-modulated radio frequency signal.

Above was described the audio-frequency arrangement, in which the audio signal is transmitted and adapted to be received at the shore station and used to determine ship's heading. Accordingly, a band of radio frequencies could be swept as the ship turns in a circle, and then this variable frequency received and used to determine ship's heading. Also frequency modulation and phase modulation could be used as a function of ship's heading.

Referring to Figure 2, it is seen that the audio-modulated signal is received at the shore station through the radio antenna. It is then fed through a field strength meter 7 in order to obtain the two desired outputs. At the "recorder" terminals 8 is obtained a D. C. voltage, proportional to the field strength produced by the radio frequency signal. This voltage is applied to a self-balancing potentiometer 9, where a motor regulates the variable resistor so as to balance out the applied input voltage. The motor operates a worm and block arrangement 10, whereby a pencil recorder 11 is made to move radially in and out on the chart paper, as a function of field strength.

At the "phone" terminals 12 is obtained an audio-frequency signal, whose frequency varies with ship's heading and whose amplitude depends on field strength. This signal is sent through a limiter stage 13 where its peaks are clipped; the output signal is of constant amplitude, but the frequency still depends on ship's heading. The output of a standard discriminator 14 produces an audio signal of variable frequency, whose amplitude depends on frequency and thus on ship's heading. This signal is then rectified by 15 to obtain a D. C. voltage, dependent only on ship's heading. A self-balancing potentiometer 16, of the type discussed above, balances out this voltage, so that the motor 17 rotates a turntable 18 the correct number of degrees corresponding to ship's heading. Thus the pencil recorder moves radially as a function of field strength, and the turntable rotates according to ship's heading thereby tracing the radiation pattern of the ship's antenna.

Figure 3:
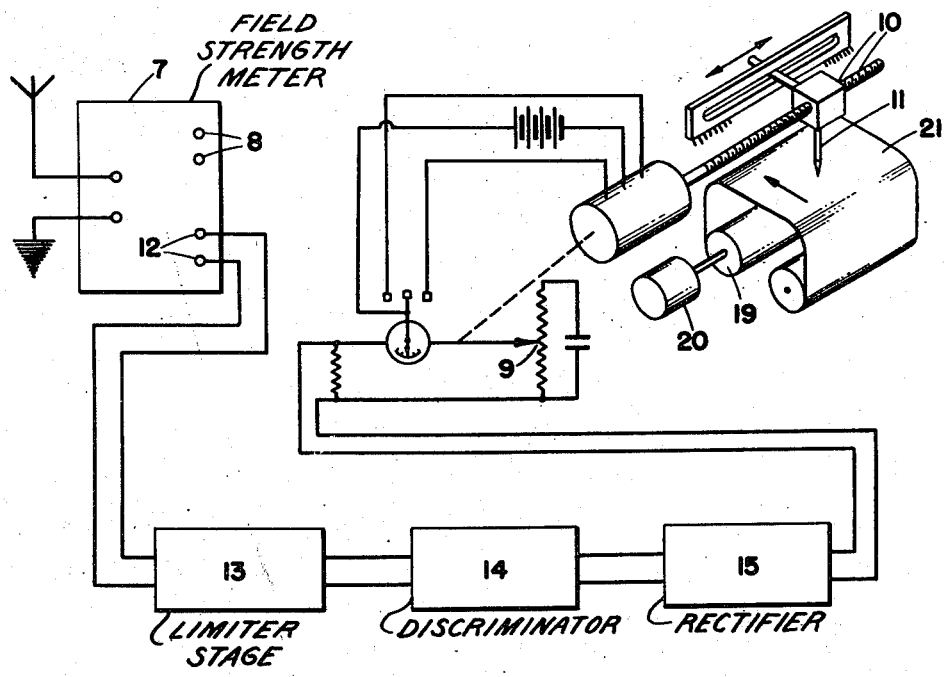
Figure 3 is a diagram of the shore station equipment also, but with an alternate method of indication.

Figure 3 is essentially like Figure 2, the only difference being the manner of recording on the chart. In this method, the output of the rectifier 15 is fed through a self-balancing potentiometer 9 where the motor, instead of rotating a turntable, drives a pencil recorder 11 through a worm and block arrangement 10 similar to the one in Figure 2. Thus the pencil recorder now operates as a function of ship's heading, moving up and down on graph paper graduated from 0°–360°. A spool 19, driven by a synchronous motor 20 at the desired rate, causes the continuous flow of chart paper 21 under the pencil 11.

The chart, therefore, represents a record of ship's heading versus time.

The invention described herein may be manufactured and used by or for the Government of the United States of America for governmental purposes without the payment of any royalties thereon or therefor.

What I claim is:

1. A system comprising a vehicular signal-emitting station, means included in said station for varying a characteristic of its emitted signal in accordance with displacement from a base heading, and a remote receiving station, means at said receiving station for measuring and indicating the field strength and said characteristic of the received signal at each value thereof, last said means providing an indication of the radiation pattern of the vehicle's antenna system.

2. The method of testing the radiation pattern of a mobile transmitting station comprising, radiating from said station a carrier wave modulated at a frequency proportional to deviation of the orientation of the station from a reference orientation, varying said orientation through substantially three hundred and sixty degrees during said radiation, receiving and metering at a fixed station said carrier wave, converting a part of the metered signal corresponding to the field strength of said carrier wave into a signal, converting a further part of the metered signal corresponding to said frequency into a signal proportional to the instant value of said deviation, and indicating instantaneous values of said field strength corresponding to each said variation of orientation from the reference orientation.

3. The method of plotting the radiation pattern of a vehicular radio station comprising the steps of, continuously transmitting fixed frequency radio carrier waves from said station during a turn of said vehicular station, modulating said carrier waves at an audio frequency continuously varied throughout said turn proportionately to the instant variation in heading from a base heading of the vehicular station, receiving said carrier waves at a shore station, continuously field strength metering said received waves, continuously applying a signal proportional to said field strength, deriving from said received waves a signal proportional to said modulation frequency, and applying the derived signal to rotatively position a polar coordinate chart for recording thereon said instant variation in heading and said radial deflection.

4. In a testing system for a vehicular radio transmitter, means continuously radiating a carrier wave from said transmitter, gyro-controlled means modulating the carrier wave at a frequency proportional to the instant heading of the vehicular transmitter relative to a base heading, a fixed station receiver for said carrier wave including field strength metering means, a polar coordinate recorder having radial deflection means, self-balancing potentiometer means driving said deflection means proportionately to the metered field strength, modulation frequency detecting means responsively connected to the metering means, means converting the detected instantaneous modulation frequency to a direct current signal of amplitude proportional to said frequency, and self-balancing potentiometer means connected for response to said signal and controlling the instant degree of rotation of said recorder according to said instant heading of the transmitter, whereby the recorder registers radial deflections according to field strength and rotational deflections according to the heading of the vehicular transmitter.

ROBERT J. URICK.

REFERENCES CITED

The following references are of record in the file of this patent:

UNITED STATES PATENTS

| Number | Name | Date |
|---|---|---|
| 1,983,079 | Hansen | Dec. 4, 1934 |
| 2,213,886 | Potter | Sept. 3, 1940 |
| 2,273,914 | Wallace | Feb. 24, 1942 |
| 2,363,473 | Ryder | Nov. 21, 1944 |
| 2,403,603 | Korn | July 9, 1946 |
| 2,404,501 | Kear | July 23, 1946 |
| 2,406,406 | Sandretto et al. | Aug. 27, 1946 |
| 2,408,819 | Sorensen | Oct. 8, 1946 |
| 2,429,771 | Roberts | Oct. 28, 1947 |
| 2,444,439 | Greig | July 6, 1948 |

FOREIGN PATENTS

| Number | Country | Date |
|---|---|---|
| 149,826 | Great Britain | Aug. 26, 1920 |
| 380,466 | Great Britain | Sept. 15, 1932 |